INVENTOR.
CORNELIUS A. TOBIAS
BY
ATTORNEY.

United States Patent Office 3,488,494
Patented Jan. 6, 1970

3,488,494
ION MICROSCOPE THE IMAGE OF WHICH REPRESENTS THE INTENSITY OF SECONDARY RADIATION AS A FUNCTION OF THE POSITION OF THE PRIMARY IONS CAUSING THE RADIATION
Cornelius A. Tobias, Walnut Creek, Calif., assignor to the United States of America as represented by the United States Atomic Energy Commission
Filed June 15, 1967, Ser. No. 646,802
Int. Cl. H01j 37/26
U.S. Cl. 250—49.5     8 Claims

ABSTRACT OF THE DISCLOSURE

This invention relates to a microscope utilizing atomic or nuclear particles directed in a parallel beam through a specimen, causing secondary radiation to be emitted therefrom. The position coordinates of the path of each particle are determined and the secondary radiation is measured for each particle. An enlarged image of the specimen is constructed by combining such information from many particles to form a composite image.

BACKGROUND OF THE INVENTION

This invention relates generally to microscopy and more particularly to a microscope utilizing particle radiation for detecting the internal structure of a specimen to be observed. The invention described herein was made in the course of, or under, Contract W–7405–eng–48 with the Atomic Energy Commission.

Analysis of the properties of microscopes indicate that several criteria must be satisfied to obtain satisfactory images. One of the criteria is that the primary radiation used for microscopy should in some way interact with the specimen. In the case of light microscopy and in traditional electron microscopy, the diffracted or scattered primary radiation is the important quality. In other instances, secondary radiation emitted from a specimen, as a result of bombardment by primary radiation particles such as heavy ions or electrons, is used as an indicator of interaction. Another requirement is to have knowledge of the position of the particles when they strike the specimen. In conventional electron microscopy this is satisfied by producing an image of the specimen on the target screen using primary radiation that has been altered by interaction with the specimen. In scanning type microscopes, localization of the place of interaction is by recording the parameters of magnetic, electrical, or mechanical deflection of a primary radiation beam as a function of time. However, scnning implies the production of a microbeam and this in turn implies a loss of resolution because of scattering from a microaperture and other difficulties of producing a microbeam.

SUMMARY OF THE INVENTION

In the present invention, the idea of detecting secondary radiation from a specimen as an indicator of interaction between a primary radiation particle and a specimen is utilized, but the resolution problems of a scanning type microscope are avoided. In the invention, a parallel beam of primary radiation particles are directed at a specimen, the particles passing through the specimen at random points. Interaction with the specimen is measured by registering secondary electrons, photons, or nuclear recoils. The particles then pass through an analyzer, placed near the specimen, for determining where the particle is. The analyzer can be a detector with a known regular submicroscopic structure such as a crystal. Interaction between the primary particles with the molecules of the analyzer will produce information leading to location of a particular primary radiation particle. Information on the location, when it is combined with the information on the secondaries emitted, can be displayed on an oscilloscope. The problem of resolution then depends on the structure and interactions of the analyzer. By combining high resolution detectors with electromagnetic lens magnification, resolution on the order of angstroms may be achieved.

The image obtained is more related to the composition of the specimen than the physical appearance. Depending upon the type of secondaries detected the image may show only surface composition of the specimen or it may also indicate subsurface composition. The apparatus is particularly advantageous for examining living organisms.

It is an object of the present invention to provide a new and improved means for determining the microstructure of a specimen.

It is another object of the present invention to provide a microscope having a potentially higher degree of resolution than previous microscopes.

It is another object of the present invention to provide a microscope capable of viewing relatively thick specimens.

BRIEF DESCRIPTION OF THE DRAWING

The invention will be best understood by reference to the drawing of which.

DESCRIPTION OF PREFERRED EMBODIMENTS

Figure 1:
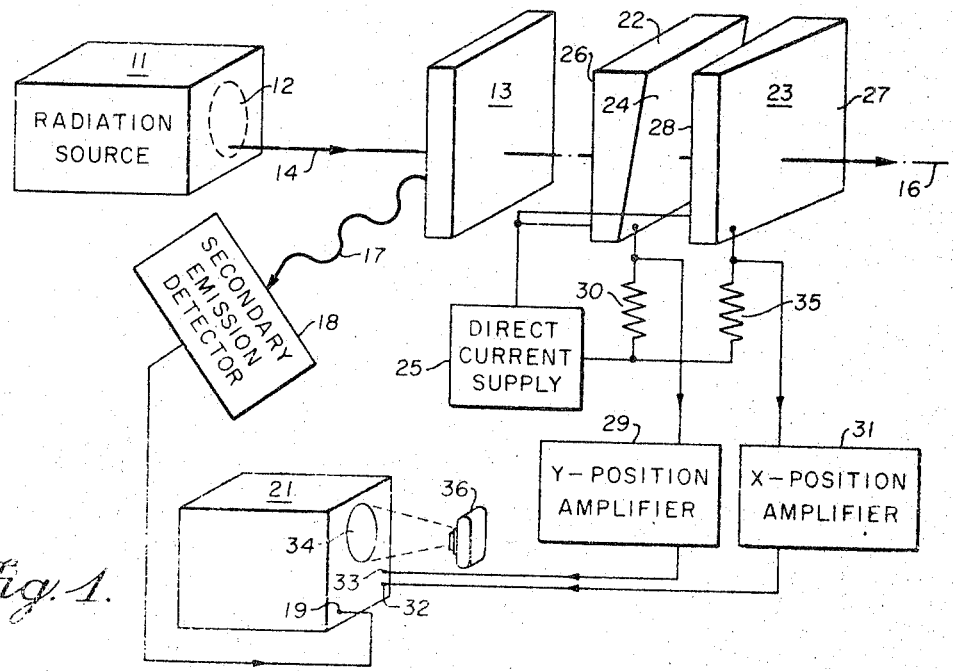
FIGURE 1 is a simplified view of the major components of a microscope according to the present invention with electrical circuitry indicated in block form.

Referring now to FIGURE 1, there is shown a radiation source 11 which might typically be a particle accelerator such as a synchrotron. The beam 12 from an accelerator is generally comprised of parallel directed monoenergetic particles. While heavy ions and protons are considered to be preferable for high resolution and penetrating capability in the present invention, operation could be obtained with lighter particles such as electrons. The beam 12 must have a sufficiently low intensity so that, depending upon the resolution time of the subsequent detection and data presentation apparatus, the particles can be considered to be arriving at the various detectors one at a time. That is, each particle must be separately detected and separately indicated in the readout means.

A specimen 13 is disposed in the path of the beam and the effects of one single beam particle 14 following a line 16 will be considered to provide an example of operation. When the particle 14 enters the specimen 13, secondary products 17 are formed which may be of the atomic variety, such as secondary electrons, X-rays or visible light, or the secondaries may be nuclear reaction products. The quantity of such secondaries 17 is related to the composition and structure of the specimen on the line 16. A secondary emission detector 18 is suitably disposed to receive the secondaries 17 and, obviously, will be the appropriate type of detector necessary for responding to the particular secondary products of interest, that is, a light detector, X-ray detector, etc. Output signals from the secondary detector 18 are applied to the cathode-ray beam intensity control terminal 19 of an oscilloscope 21 so that the brightness of the indication on the oscilloscope corresponds to the intensity of the secondaries 17 detected.

Considering again the particle 14, after it passes through the specimen 13, the particle passes through both a vertical or Y axis position analyzer 22 and a horizontal or X position analyzer 23. Such analyzers 22 and 23 are each a wedge-shaped solid state, lithium drifted crystal of the general type described in the periodical, Physical Review, vol. 119, No. 3, August 1960, pp. 1014–1021 entitled "Diffusion of Lithium in Silicon at High Temperature and the Isotope Effect." The particle 14 passes through each analyzer 22 and 23 in succession and generates an electrical charge thereacross. Such charge appears between the sloping face 24 and opposing face 26 of analyzer 22 and between sloping face 27 and opposing face 28 of analyzer 23. Thin conductive layers deposited on each of such faces 24, 26, 27 and 28 provide for impressing appropriate electrical operating potential across the bodies of analyzers 22 and 23 from a direct current supply 25 through load resistors 30 and 35. Signals developed across load resistors 30 and 35 are coupled to Y-position amplifier 29 and X-position amplifier 31 respectively. The electrical signals from the two analyzers 22 and 23 each have an amplitude dependent upon the thickness of the analyzer at particle path 16, that is, the thicker the analyzer at path 16, the higher the signal amplitude. For accurate results with such a position detector, it is essential that all the beam particles from source 11 have the same original energy. Such a monoenergetic beam is readily obtainable using existing technology. Amplified versions of the potentials produced in the X and Y analyzers 23 and 22 are applied to corresponding X and Y position control terminals 32 and 33 of oscilloscope 21.

In operation, upon passage of a particle 14, the cathode-ray beam in the oscilloscope 21 is deflected to a corresponding point on the screen 34. Simultaneously, the intensity of the cathode-ray beam is controlled according to the intensity of the secondary radiation detected at detector 18, and a spot or dot of light is produced on screen 34. A camera 36 set for a time exposure records the spot of light on screen 34. Over a time period during which many particles from the source 11 are detected, a composite image of the specimen 13 is recorded by camera 36.

It will be obvious that many variations are possible, that is, the recording function of the camera 36 could be eliminated by utilizing a memory type oscilloscope. The position analyzers 22 and 23 might be replaced by other semiconductor devices such as the ribbon detector and the checkerboard detector as described respectively in IEEE Transactions on Nuclear Science, vol. NS–12, No. 1, pp. 247–254 (1965), by Ludwig et al. and the IEEE Transactions on Nuclear Science, vol. NS–13, No. 3, pp. 208–213 (1966). With such detectors the necessity for a monoenergetic beam is relaxed.

Figure 2:
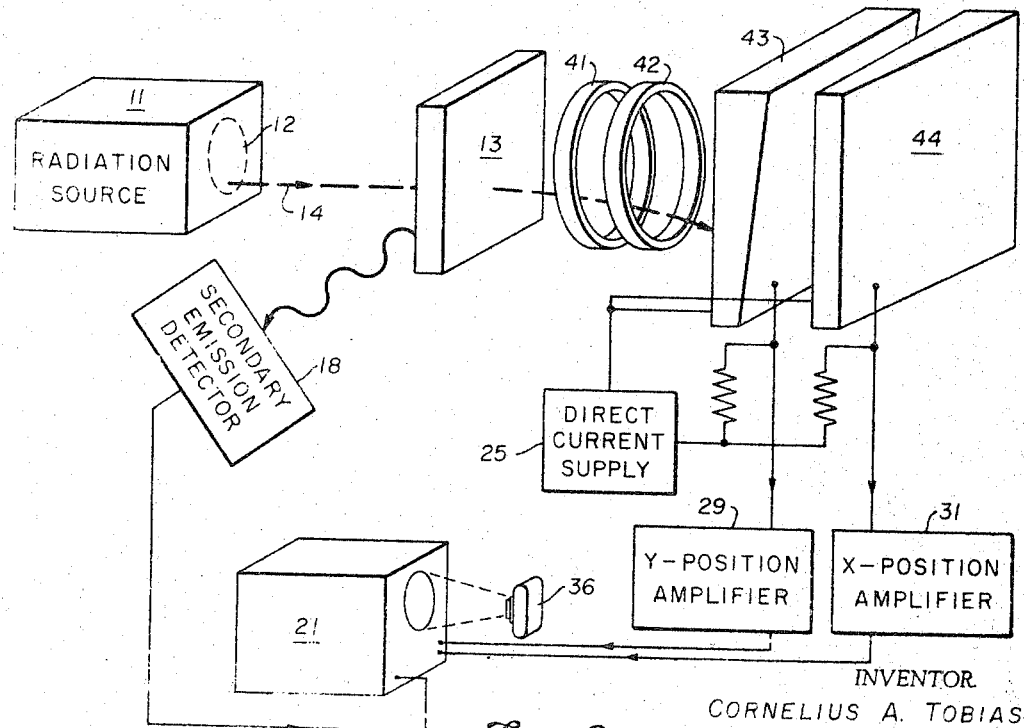
FIGURE 2 is a view of another embodiment of the invention utilizing a magnetic lens to increase position detection accuracy.

Referring now to FIGURE 2, there is shown an alternate embodiment of the invention in which a differing position detecting means is utilized to increase particle position detecting accuracy. As with the apparatus of FIGURE 1, a beam 12 of monoenergetic particles is directed at a specimen 13 and resulting secondaries enter secondary emission detector 18. However, after a particle 14 has passed through the specimen 13, it passes through a magnetic lens formed by magnet coils 41 and 42 which deflects the originally parallel beam particles into diverging paths. Such lens might be considered to provide an enlarged view of the specimen and thus the position analyzers 43 and 44 may be larger than the analyzers of FIGURE 1. Such enlarging eases the accuracy requirements for the shaping and the internal structure of the analyzers.

To enhance the resolution for high magnification, it may be desirable to enclose the microscope in a vacuum chamber to avoid scattering of the particles.

Many variations are possible within the spirit and scope of the invention and it is not intended to limit the invention except as defined in the following claims.

What is claimed is:

1. In a microscope utilizing particle interactions to determine the structure of a specimen, the combination comprising a source of charged particle radiation providing a beam of parallel particles directed at said specimen, means detecting secondary radiation from said specimen, means sensing said particles after they have resultingly passed through said specimen and thereby detecting, and means generating coordinate position signals indicative of the path of said particles through said specimen, image display and recording means having image positioning controls receiving said coordinate position signals and having an intensity control receiving signals from said secondary radiation detecting means whereby an image of said specimen is produced.

2. A microscope as described in claim 1 wherein said charged particles from said source all have equal energies.

3. A microscope as described in claim 2 wherein said means detecting and generating coordinate position signals is a pair of wedge-shaped solid state charged particle detecting crystals each disposed across the path of said particles, the tapers of said wedge-shaped crystals being transversely oriented, said crystals each being of the class developing signals thereacross having an amplitude proportional to the length of said path in said crystals.

4. A microscope as described in claim 3 wherein said image display and recording means has a cathode-ray-tube in which an electron beam is deflected in one direction according to the amplitude of signals from one of said crystals and deflected in a transverse direction according to the amplitude of signals from the other of said crystals, said cathode-ray-tube having a beam intensity control receiving signals from said secondary radiation detecting means whereby the intensity of said electron beam is proportional to the intensity of said secondary radiation.

5. A microscope as described in claim 3 wherein said crystals are lithium drifted.

6. A microscope as described in claim 1 wherein a diverging type charged particle deflecting lens is disposed between said specimen and said detecting and generating means.

7. A microscope as described in claim 6 wherein said beam deflecting lens is an annular magnet coil with a central channel through which said beam is directed.

8. A microscope as described in claim 1 wherein said charged particles from said source are ions.

References Cited

UNITED STATES PATENTS

| | | |
|---|---|---|
| 3,235,727 | 2/1966 | Shapiro. |
| 3,370,167 | 2/1968 | Sterk _____ 250—51.5 |
| 3,370,168 | 2/1968 | Komoda _____ 250—49.55 |

OTHER REFERENCES 30 k.e.v. Ion Bombardment Apparatus for Study of Interaction of Light Ions With Surfaces, McCracken, The Review of Scientific Instruments, vol. 37, No. 7, July 1966, pp. 860–866.

RALPH G. NILSON, Primary Examiner

C. E. CHURCH, Assistant Examiner